United States Patent [19]
DeGuisseppe

[11] Patent Number: 4,722,264
[45] Date of Patent: Feb. 2, 1988

[54] BUILT IN AIR FRAGRANCE UNIT

[76] Inventor: Thomas R. DeGuisseppe, P.O. Box 1322, Westhampton Beach, N.Y. 11978

[21] Appl. No.: 12,472

[22] Filed: Feb. 9, 1987

[51] Int. Cl.$^4$ .............................................. B60H 3/00
[52] U.S. Cl. ..................................... 98/2.11; 422/124
[58] Field of Search ....................... 98/2.11, 105, 109; 422/123, 124

[56] References Cited

U.S. PATENT DOCUMENTS

| | | | |
|---|---|---|---|
| 74,936 | 2/1868 | Perkins | 98/109 |
| 234,369 | 11/1880 | Bucher | 98/109 |
| 1,785,253 | 12/1930 | Gammeter | 98/109 X |
| 2,867,866 | 1/1959 | Steele | 422/124 |
| 3,930,797 | 1/1976 | Gertz | 98/109 X |
| 3,990,848 | 11/1976 | Corris | 422/124 X |
| 4,383,377 | 5/1983 | Crafton | 422/124 X |

FOREIGN PATENT DOCUMENTS

| | | | |
|---|---|---|---|
| 2814927 | 5/1979 | Fed. Rep. of Germany | 98/2.11 |
| 118520 | 7/1984 | Japan | 98/2.11 |

Primary Examiner—Harold Joyce
Attorney, Agent, or Firm—Leonard Belkin

[57] ABSTRACT

Aroma producing apparatus for use in a center location in the dashboard for even distribution within the passenger compartment of a vehicle employing a housing containing a fan and a slide tray containing the material to be vaporized. The tray is conveniently replaceable and vents are provided to direct the flow of air and a shutter arrangement is provided to prevent vapor generation. The unit may be mounted in the dashboard or mounted below the dashboard.

5 Claims, 8 Drawing Figures

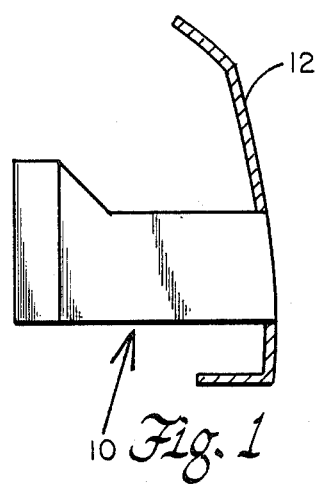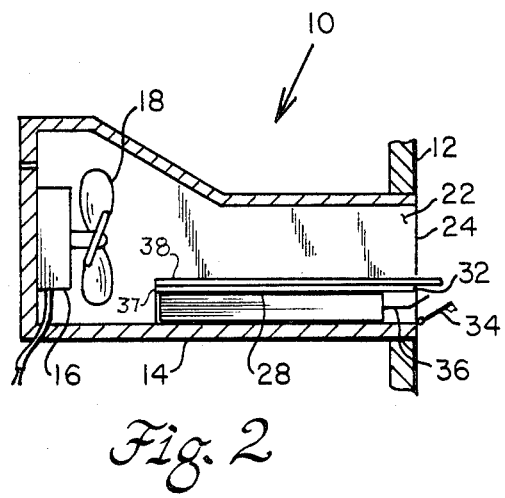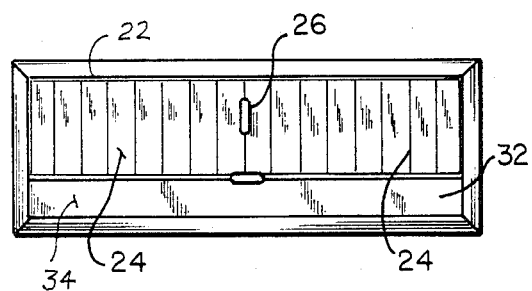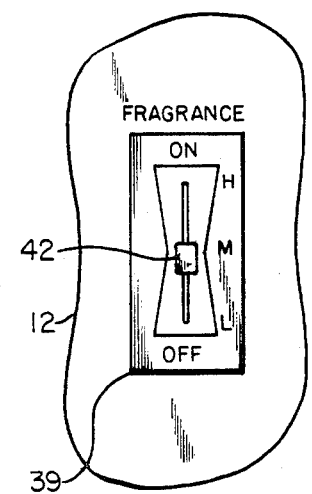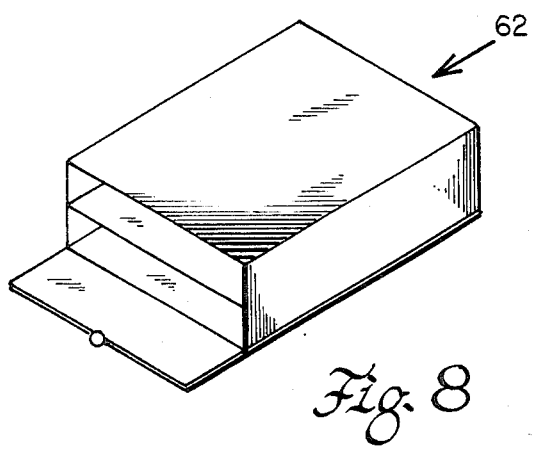

BUILT IN AIR FRAGRANCE UNIT

BACKGROUND OF THE INVENTION

This invention relates to a built-in air fragrance unit and more particularly to an arrangement for selectively freshening the air within the passenger compartment of a vehicle.

Devices for deodorizing the air, and for producing a pleasant aroma, within a vehicle are available in a variety of arrangements and configurations, as seen in several United States Patents.

The patent to Baker et al (U.S. Pat. No. 2,731,104) only provides for air movement. In addition, the vent is placed in an inaccessible location. Shields et al (U.S. Pat. No. 2,778,678) is for a deodorant dispenser which is excessively complicated and expensive. Gilbertson (U.S. Pat. No. 3,722,182) shows a complicated and clumsy device for deodorizing the air in automobiles. Also, it does not provide for the addition of a fragrance.

Suzuki et al (U.S. Pat. No. 4,245,550) discloses an air filtering system which is not conveniently located and is excessively large and complicated. Sone et al (U.S. Pat. No. 4,274,843) discloses an electrostatic air purifier which does not provide for the addition of a fragrance to the air in an automobile.

The patent to Miller (U.S. Pat. No. 4,309,382) shows a complicated and expensive apparatus for deodorizing the air while Spector (U.S. Pat. No. 4,523,870) acts like a hanging air freshner and could be inconvenient and interfere with activities in the driving compartment.

It is seen that these patented arrangements are either complicated and therefore expensive to install, inefficient, or are highly inconvenient to use.

SUMMARY OF THE PRESENT INVENTION

In this invention there is provided an arrangement for deodorizing or imparting a pleasant odor to the air within a vehicle which is simple, economic, highly efficent, and very effective.

In accordance with a preferred embodiment of this invention there is provided a housing which may be mounted within or under the dashboard of a vehicle having a vent opening, a fan within the housing for blowing air out through said vent, and a tray in the housing under the vent for containing a vaporizable material having a pleasant fragrance when vaporized. The fan when energized blows air over the material in the tray and out through the vent into the passenger compartment of the vehicle. A switch conveniently located makes it possible for an occupant to have a pleasant fragrance within the vehicle whenever such is desired.

It is therefore a principal object of this invention to provide an improved yet simple and economic arrangement for imparting a pleasant fragrance to the air in the passenger compartment of a vehicle.

Other objects and advantages of this invention will hereinafter become obvious from the following description of preferred embodiments of this invention.

BRIEF DESCRIPTION OF THE FIGURES

FIG. 1 is an elevation, partially schematic view in partial section showing the mounting of a preferred embodiment of this invention in a dashboard.

FIG. 2 is a section, elevation view of the unit shown in FIG. 1.

FIG. 3 is a front view of the unit mounted as in FIGS. 1 and 2.

FIG. 6 is a front view of a dashboard mounted switch assembly.

FIG. 8 is an isometric view of a storage container with its door open for storing new and partially used trays for carrying the fragrance producing materials.

DETAILED DESCRIPTION OF THE PREFERRED EMBODIMENTS

Figure 4:
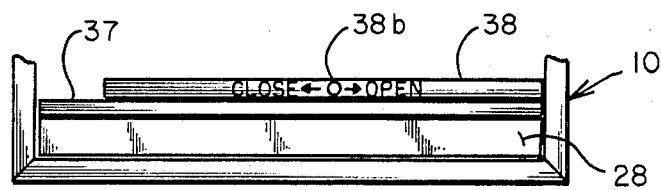
FIG. 4 is a detail of the lower portion of the front view shown in FIG. 3.

Referring to FIG. 1 there is illustrated a preferred embodiment of the invention consisting of a unit 10 mounted within a dashboard 12 of a vehicle.

As seen in FIGS. 2 and 3, unit 10 consists of a housing 14 containing a fan 16 with blades 18 at the rear end and at the front of unit 10 at dashboard 12 with an opening 22 controlled by turnable vertical shutters 24. A center knob 26, as is conventional in the art, is employed to change the direction of air flow leaving housing 14 (i.e., either left or right, up or down, etc.). Unit 10 may be located centrally within dashboard 12 to insure even distribution of the air containing the fragrance.

Located at the bottom of housing 14 is a slide tray 28 open at the top and filled with a suitable granulated material or gel which upon vaporization has a fragrant odor. An opening 32 in housing 14 beneath shutters 24 permits tray 28 to be inserted or removed. As seen in FIG. 2, a spring loaded cover 34 may be provided to cover opening 32, while the front of tray 28 may be provided with a leader 36 extending out past cover 24 to make it convenient to remove tray 28 either for replacement or to refill with the vaporizable material. It will be noted that housing 14 converges downstream of fan 16 to convert air pressure into increased air velocity to enhance the rate of evaporation.

Figure 5:
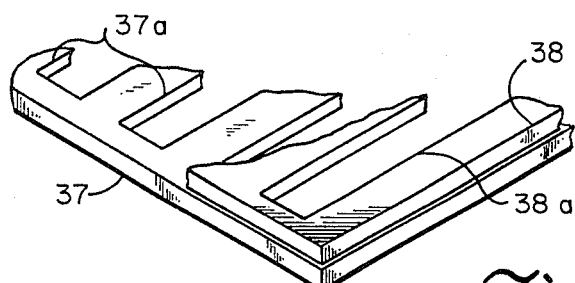
FIG. 5 is an isometric view partially broken away of the mechanism for cutting off the production of the fragrance.

In order to permit air circulation without generation of a fragrance, reference is made to FIGS. 4 and 5. Above tray 28 is mounted a stationary board or partition 37 having a plurality of elongated, spaced slots 37a. On top of partition 37 is a slidable member 38 with a plurality of elongated, spaced slots 38a identical to slots 37a. A handle or knob 38b on member 38 permits the latter to be moved between its position to the right (seen in FIG. 4) wherein slots 38a are aligned with slots 37a in a shutter arrangement thereby permitting the air to flow over the material within tray 28 to generate the fragrance laden vapor, or moved to the left where the slots are not aligned, and in fact, closing off slots 37a to prevent the generation of the vapors.

As seen in FIG. 6, a switch assembly 39 may be mounted in dashboard 12 at some convenient location. Switch assembly 39 contains an electric switch member 42 slidable between its OFF position at the lower end of its travel to its maximum fan speed at the upper end of its travel. A FRAGRANCE indicator may be employed to indicate the function of the switch. Switch assembly 39 and fan 26 would be wired into the electrical system of the vehicle as is understood in the art.

In the arrangement shown in FIGS. 1-6, unit 10 is illustrated as being built into the dashboard of the vehicle such as would be the case when this invention is employed as original equipment.

Figure 7:
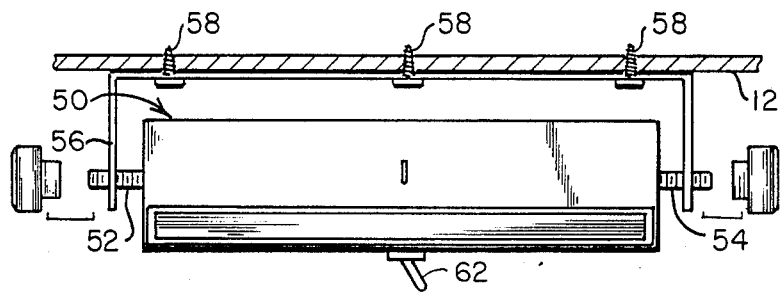
FIG. 7 is a front view of an alternative mounting of the preferred embodiment.

However, the invention may be employed as add-on equipment in which case it could be suspended underneath the dashboard. As seen in FIG. 7, unit 50 embodying the principles of this invention is shown suspended from the bottom of dashboard 12. Unit 50 is identical to unit 10 except for the provision of mounting screws 52 and 54 protruding from its sides for mounting on a bracket 56 in the shape of an inverted U attached by self tapping screws 58 to dashboard 12, and an electrical switch 62 mounted conveniently for use.

In the operation of the invention herein described it is only necessary to insure that there is fragrant aroma producing material in the slide tray and to turn the switch on when the fragrance is desired and to slide member 38 to its open position.

If it is desired to have air flow without generation of the fragrance laden odor, then fan 16 would be on but member 38 moved to its closed position.

The material employed is generally available commerically and any number of different types of fragrances can be obtained. In addition, a deodorizing or air purifying material may be employed if available and if desired.

The slide tray containing granules or gel of the material having the desired fragrance may be replaced at any time to obtain a different fragrance. A portable container 62 such as that shown in FIG. 8 may be employed to contain new or partially used trays 28 for storage in the glove compartment of the vehicle. In any event, the apparatus is convenient to use, highly effective and efficient since the material is used up only when desired, and economical in construction and use.

While only certain preferred embodiments of this invention have been described, it is understood that many variations of this invention are possible without departing from this invention as defined in the claims which follow.

What is claimed is:

1. In combination, a vehicle, apparatus for imparting a pleasant fragrance to the air within said vehicle having a dashboard comprising housing means fully enclosed with a vent opening mounted within said dashboard with vent opening penetrating said dashboard, fan means within said housing means for blowing air through said vent opening into the interior of said vehicle, slide tray means open at the top for containing a material which upon evaporation has a pleasant fragrance, means within said housing means for accommodating said slide tray means beneath said vent, whereby air movement generated by said fan means passes over said tray causing evaporation of said material, said housing means converging downstream of said fan means to increase velocity of the air flowing over said material thereby enhancing the rate or material evaporation, and means conveniently located within said vehicle for selectively energizing or deenergizing said fan means whereby an occupant of said vehicle is able to conveniently and at will generate air flow, means for selectively permitting generation of said fragrance while said fan means is operating, and door means beneath said vent opening mounted within said dashboard accessible from the front for permitting convenient removal and replacement of said slide tray means.

2. The apparatus of claim 1 wherein said slide tray means is provided with a leader at the front end thereof facing said door means for permitting convenient grasping and removal of said slide tray means.

3. The apparatus of claim 2 having switch means mounted on said dashboard for controlling the operation and speed of said fan means thereby permitting the rate of discharge of the fragrance laden air into the interior of said vehicle.

4. The apparatus of claim 3 wherein said means for selectively permitting generation of said fragrance consists of a stationary, slotted partition means above said tray means, and a slotted member above said partition means slidable between a position blocking the slotted openings in said partition means to prevent generation of vapors and a position unblocking said openings to permit generation of said vapors.

5. Apparatus for imparting a pleasant fragrance to the air within a vehicle having a dashboard comprising housing means fully enclosed with a vent opening, bracket means for supporting said housing means below said dashboard with said vent opening facing into the interior of said vehicle, fan means within and at the rear of said housing means for blowing air through said vent opening into the interior of said vehicle, slide tray means open at the top for containing a material which upon evaporation has a pleasant fragrance, means within said housing means for accommodating said slide tray means beneath said vent whereby air movement generated by said fan means passes over said tray causing evaporation of said material, said housing means converging downstream of said fan means to increase velocity of the air flowing over said material whereby enhancing the rate of material evaporation, means above said tray means for selectively blocking or unblocking exposure of the interior of said tray means to said air movement thereby permitting air flow with or without generation of said fragrance, and switch means located on said housing means for controlling operation of said fan means.

* * * * *